(12) United States Patent
Hilemon et al.

(10) Patent No.: US 10,484,388 B2
(45) Date of Patent: Nov. 19, 2019

(54) SPAN OF RESPONSIBILITY ACCESS CONTROL SYSTEM

(71) Applicant: Computational Systems, Inc., Knoxville, TN (US)

(72) Inventors: Christopher G. Hilemon, Knoxville, TN (US); Anthony J. Hayzen, Knoxville, TN (US); Trevor D. Schleiss, Austin, TX (US); Manikandan Janardhanan, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 310 days.

(21) Appl. No.: 15/239,704

(22) Filed: Aug. 17, 2016

(65) Prior Publication Data

US 2017/0104760 A1   Apr. 13, 2017

Related U.S. Application Data

(60) Provisional application No. 62/239,970, filed on Oct. 11, 2015.

(51) Int. Cl.
*H04L 29/06* (2006.01)

(52) U.S. Cl.
CPC .......... *H04L 63/102* (2013.01); *H04L 63/101* (2013.01)

(58) Field of Classification Search
CPC ..... H04L 63/08; H04L 63/101; H04L 63/102; G05B 2219/31334
See application file for complete search history.

(56) References Cited

U.S. PATENT DOCUMENTS

| 7,574,509 | B2* | 8/2009 | Nixon | H04W 72/02 709/228 |
| 9,218,470 | B2* | 12/2015 | Domke | G06F 21/31 |
| 2007/0142941 | A1* | 6/2007 | McGreevy | G06Q 10/00 700/83 |
| 2008/0162930 | A1* | 7/2008 | Finney | H04L 63/083 713/165 |

(Continued)

OTHER PUBLICATIONS

Huang et al., "A Framework Integrating Attribute-based Policies into Role-Based Access Control", pp. 187-196, Jun. 2012, SACMAT'12 (Year: 2012).*

(Continued)

*Primary Examiner* — Hee K Song
(74) *Attorney, Agent, or Firm* — Luedeka Neely Group, P.C.; Rick Barnes

(57) ABSTRACT

A span of responsibility access control system for use in plant process management and similar applications. The system leverages span-of-responsibility enabled user accounts and corresponding resource properties to assign, verify, and control access to assets and other resources in the plant process management system on a per user basis. Aspects of the system include configuration of properties for each monitored or controlled asset and association of a span of responsibility based on asset properties, such as asset type and location, with a user account. An access control module compares asset properties to the span of responsibility associated with the user account to determine whether the user is entitled to access any given asset, independent of determining permissions to act on such asset.

13 Claims, 10 Drawing Sheets

(56) References Cited

U.S. PATENT DOCUMENTS

| | | | | |
|---|---|---|---|---|
| 2009/0222220 | A1* | 9/2009 | Wilke | F16K 37/0091 |
| | | | | 702/34 |
| 2010/0083229 | A1* | 4/2010 | Chouinard | G06F 21/629 |
| | | | | 717/120 |
| 2010/0305721 | A1* | 12/2010 | Kostadinov | G05B 19/0426 |
| | | | | 700/87 |
| 2012/0259436 | A1* | 10/2012 | Resurreccion | G05B 23/0216 |
| | | | | 700/17 |
| 2013/0291094 | A1* | 10/2013 | Sahoo | G06F 21/45 |
| | | | | 726/19 |
| 2014/0108985 | A1* | 4/2014 | Scott | G06F 3/0484 |
| | | | | 715/771 |
| 2014/0189851 | A1* | 7/2014 | Domke | G06F 21/31 |
| | | | | 726/17 |
| 2014/0223512 | A1* | 8/2014 | Hagiwara | H04L 63/20 |
| | | | | 726/4 |
| 2015/0058228 | A1* | 2/2015 | Voeller | G06Q 10/06313 |
| | | | | 705/301 |
| 2015/0074749 | A1* | 3/2015 | Vasko | G05B 19/4185 |
| | | | | 726/1 |
| 2015/0193418 | A1* | 7/2015 | Koska | H04L 67/10 |
| | | | | 715/223 |
| 2015/0287318 | A1* | 10/2015 | Nair | G08C 17/02 |
| | | | | 340/5.52 |
| 2016/0112406 | A1* | 4/2016 | Bugrov | H04L 63/0823 |
| | | | | 726/10 |

OTHER PUBLICATIONS

"System Manual MMS 6000, Operating Manual, Shaft Vibration Monitor MMS 6110," epro GmbH, Jöbkesweg 3, D-48599 Gronau, Germany, Sep. 12, 2007.

* cited by examiner

SPAN OF RESPONSIBILITY ACCESS CONTROL SYSTEM

This application claims rights and priority on prior U.S. provisional patent application Ser. No. 62/239,970 filed 2015 Oct. 11. This invention relates to the field of asset health monitoring and analysis. More particularly, this invention relates to a system for controlling access to various aspects of asset health information gathering, reporting, and analysis.

FIELD

Introduction

Manufacturing and processing plants typically utilize many different types of machinery, often in several different locations, and monitored and controlled via plant process management system. Many conventional plant process management systems include authentication components that allow the creation of accounts for system users. By allowing system administrators to set read and write permissions, which are tied to user accounts, the plant process management system offers the ability to prevent unauthorized users from taking restricted activities involving protected system components. For example, by restricting write permissions, unauthorized users can be prevented from making changes to protected system components and, potentially, adversely affecting performance and/or operation of the process, machinery, or the system itself. Similarly, by restricting read permissions, users can be prevented from even viewing information associated with the protected system component. Such use of permission based security is typical of many systems accessible by multiple users.

Administering user accounts and system permissions on a conventional plant process management system supporting multiple users can be challenging, especially when dealing with an enterprise level or other highly sophisticated plant process management system. Factors such the number and diversity of machines being monitored or controlled and changes in equipment and staffing, add difficulty to the task of ensuring that each user has appropriate rights to all necessary system components. Often, a significant number of users require access to a small percentage of individual pieces of equipment scattered through the plant, and therefore, throughout the system. This requires permissions to be set on many separate machines and devices individually, rather than being able to set permissions on a few high level machines and letting those permissions propagate down to lower level items based on inheritance.

These scenarios tend to discourage system administrators from tightly controlling permissions. In large scale plant process management system deployments and plant process management systems used in dynamic process environments, many users have at least read permissions on a large number of machines and devices for which they have no need simply to ease the administrative burden. From an administrative perspective, leaving unnecessary read permissions in place presents little risk to system integrity and reduces the likelihood that rights to a user-required machine or device will be unintentionally curtailed. It is with respect to these and other consideration that the present invention was conceived.

SUMMARY

The following summary discusses various aspects of the invention described more fully in the detailed description and claimed herein. It is not intended and should not be used to limit the claimed invention to only such aspects or to require the invention to include all such aspects.

The span of responsibility access control system leverages span-of-responsibility enabled user accounts and corresponding resource properties to assign, verify, and control access to assets and other resources in the plant process management system on a per user basis. Span of responsibility is independent and distinct from permissions. The purpose of permissions is to define what actions a user is authorized to take against resources in the plant process management system. Span of responsibility does not determine what a user can or cannot do with an asset resource or other object in the plant process management system. Instead, span of responsibility determines whether the user can interact with, or even see, the asset resource or other object.

A typical process plant environment contains various process equipment (i.e., machinery) and field devices for monitoring and control the process equipment. Collectively, the process equipment and field devices represent the assets of the plant under control of the plant process management system. The command and control system of the plant process management system provides features and functionality, such as, system and process configuration, access control and security, asset management, and optionally, additional features and functionality, such as, but not limited to process control, alerts and reporting performance monitoring, security, machine health monitoring, predictive analysis, maintenance forecasting, and lifecycle management.

The span of responsibility access control system includes an asset manager, an authentication module, and an access control module. The asset manager configures and manages assets, maintains and configures a plant hierarchy linking assets with locations in the plant, monitors and diagnoses connected process equipment, and communicates information about the condition of process equipment to users and to other components of the plant process management system. The authentication module handles user account creation and configuration, user authentication, and authorizing actions against assets and other resources. The access control module compares asset properties to the span of responsibility associated with the user account to determine whether the user is entitled to access any given asset, independent of determining permissions to act on such asset.

Within the span of responsibility system various resources and/or resource classes may be created and configured. Instances of assets or asset sub-components, locations, users, and other resources managed by the plant process management system are created in the plant hierarchy, and optionally extended through add-ons.

Each asset resource has a number of associated properties that store basic details about the asset. Asset resources may optionally include extended properties to store additional details commonly associated with the asset and/or one or more user-defined (i.e., custom) properties for storing information about the asset that is not covered by one of the system-defined properties.

One aspect of the system facilitating the creation of asset resources is the definition of a group, or asset class, containing properties broadly applicable to certain types of assets.

Broad asset classes may be extended by defining sub-classes containing properties applicable to subsets of the assets in the parent asset class. Each sub-class inherits the properties of its parent classes. Associating each asset resource with the most specific available asset class provides the asset resource with a ready-made and applicable set of properties.

Location resources represent a corresponding physical location in the plant and primarily operate as organizational units for logically grouping asset resources according to the physical location of the corresponding physical asset. In various embodiments, asset resources are linked with location resources through the asset's location property.

Add-ons are definitions of additional general properties applicable to locations and assets, and, optionally, other resources. When an add-on is attached to an existing resource, instance, or class definition, the properties included in the add-on are added to that item and the item definition is updated to reflect that it now carries the add-on.

User accounts store the basic credentials used to authenticate a user into the plant process management system. User accounts are also associated with a set of permissions that define the actions that the user is authorized to perform against assets and other resources in the plant process management system. In addition to permissions, the user account is associated with the user's span of responsibility. The span of responsibility defines what assets and other resources in the plant process management system are accessible to the user. In various embodiments, the span of responsibility includes one or more of, but is not limited to, an asset component, a location component, and an add-on component. The span of responsibility components specify values of properties in the corresponding resources are used to determine the user's ability to access assets and resources in the plant process management system.

Span of responsibility is associated with the user account in a rights and responsibilities assignment operation. The span of responsibility location component includes at least one property for designating locations that the user is authorized to access (e.g., Accessible). In some embodiments, the span of responsibility location component may include an additional location property that stores sub-locations expressly excluded from the location assigned to the location property (e.g., Exclusions). In the preferred embodiment, locations assigned to the span of responsibility location component are restrictive in nature (i.e., closed sets). In other words, a user only has access to assets within the scope of locations assigned to the span of responsibility location component, regardless of any other span of responsibility component assignments.

Where hierarchal arrangements are used, the scope of the span of responsibility location component includes sub-locations of the assigned location(s), unless an exclusion of a specific sub-location is added. The span of responsibility asset and add-on components also include at least a property for designating specific assets, asset types/classes, and add-ons that the user is authorized to access (e.g., accessible), and optionally have a property to exclude specific assets, asset types/classes, and add-ons. In contrast to the span of responsibility location component, the span of responsibility asset and add-on components are permissive in nature (i.e., open sets).

The restrictive relationship implies a logical AND relationship between the assigned values of the span of responsibility location component and other span of responsibility components, while the permissive relationship implies a logical OR operation between the assigned values of the span of responsibility asset and add-on components. Any exclusions introduce logical ANDNOT operations into the calculation, as appropriate. Thus, the span of responsibility location component is the dominant criteria in any access verification operation.

After the initial configuration of the plant process management system and the user account, subsequent usage of the plant process management system is subject to span-of-responsibility based access control. When a user interacts with the plant process management system, the credentials provided by the user are compared to the credentials associated with the user accounts created in the plant process management system to determine the identity of the user. At a minimum, the user account credentials include a unique user identifier (e.g., a user name). In various embodiments, the user account credentials also include one or more identity proofs.

Once the user is identified, the access control module evaluates the span of responsibility for the identified user against the plant hierarchy to determine which resources that fall within the user's span of responsibility. In various embodiments, only the resources within the user's span of responsibility are visible to the user. When a user attempts to interact with an asset within the user's span of responsibility, the user's permissions are verified to determine what actions against the selected asset resource are permitted for the identified user. Permitted actions are completed and results of the action are reported to the user. Similarly, restricted actions are refused and the user notified that that action is not permitted.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

A span of responsibility access control system for use in plant process management and similar applications is described herein and illustrated in the accompanying figures. The system leverages span-of-responsibility enabled user accounts and corresponding resource properties to assign, verify, and control access to assets and other resources in the plant process management system on a per user basis. Aspects of the system include configuration of properties for each monitored or controlled asset and association of a span of responsibility based on asset properties, such as asset type and location, with a user account. An access control module compares asset properties to the span of responsibility associated with the user account to determine whether the user is entitled to access any given asset, independent of determining permissions to act on such asset.

Figure 1:
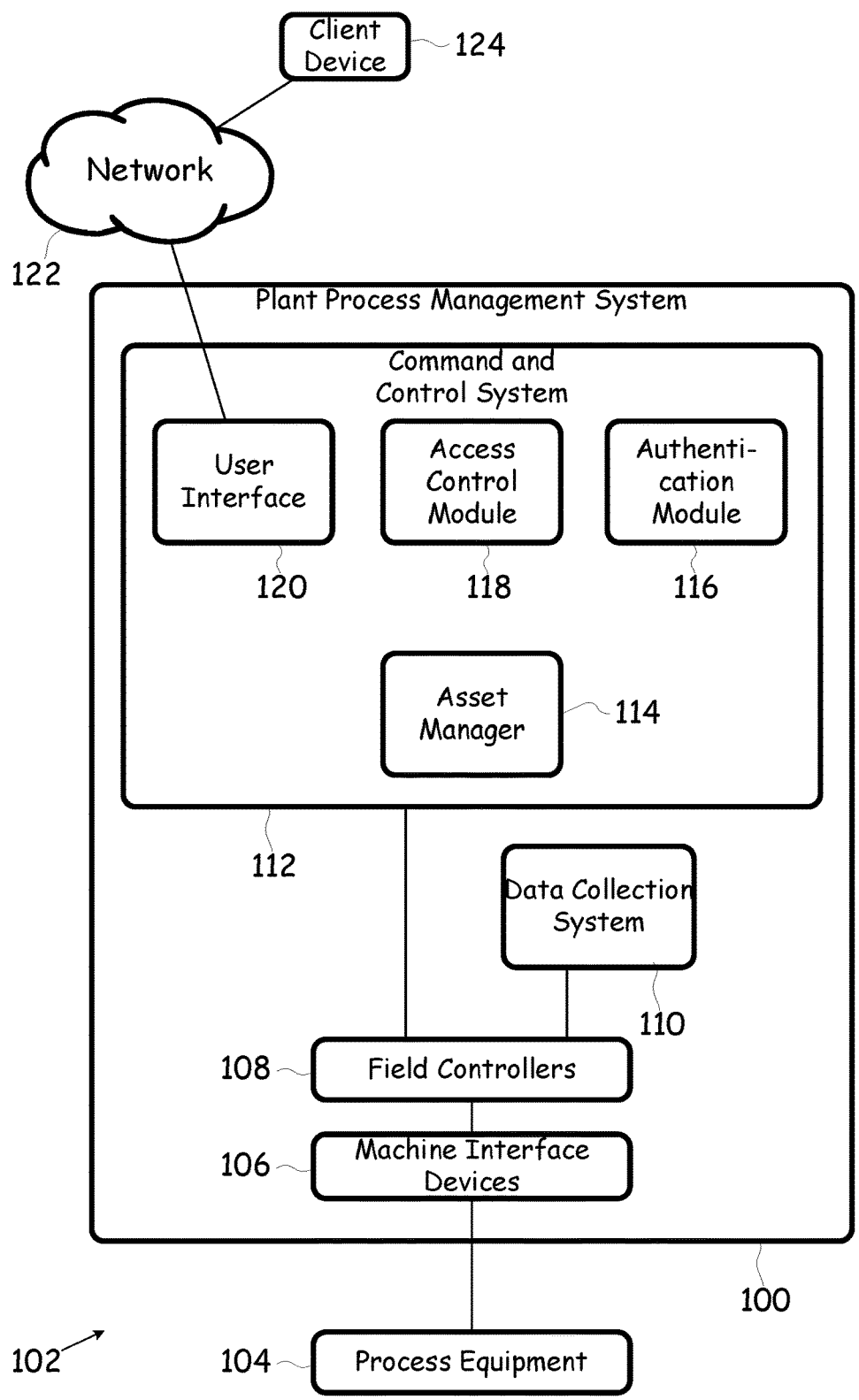
FIG. 1 is a simplified block diagram illustrating aspects of a plant process management system with span of responsibility access control according to an embodiment of the present invention.

FIG. 1 is a simplified block diagram illustrating aspects of a plant process management system with span of responsibility access control. The plant process management system 100 is illustrated in a representative plant environment control plant 102 containing various process equipment 104 (i.e., machinery). Individual process equipment units 104 are instrumented with machine interface devices 106, such as sensors for measuring process equipment parameters and control units for responding to control signals from the plant process management system 100. The machine interface devices 106 are in communication with field controllers 108 that receive and process signals from the sensors and interact with control units to drive operation of the associated process equipment. The field controllers 108 typically generate alerts when the measured parameters indicate potential problems with monitored process equipment 104, such as when the values of measured parameters cross alarm limit thresholds. Collectively, the machine interface devices 106 and field controllers 108 make up the field devices of the plant process management system 100.

The field controllers 108 interface with the data collection system 110 and the command and control system 112 of the plant process management system 100. Generally, each field controller 108 includes, at least, a processor and memory for storing and executing programs, an input/output interface, and communication interface.

The data collection system 110 receives and stores raw and/or processed sensor data sent from the field controllers 108. Generally, the data collection system 110 includes a controller, an input/output interface, and at least one data storage medium to store sensor data and passed from the asset monitor component 104 for purposes such as, record keeping and trend analysis. Examples of data storage media include volatile and non-volatile memory, fixed disk drives, and removable media drives (e.g., disc or tapes) implemented in various technologies (e.g., magnetic or optical media). Aspects of the data collection system 108 include short term and long term retention of sensor data for temporary use or archival and storage, storage of raw or processed sensor data, and down-sampling or other data compression to reduce data storage requirements.

The command and control system 112 provides features and functionality, such as, system and process configuration, access control and security, asset management, and optionally, additional features and functionality, such as, but not limited to process control, alerts and reporting, performance monitoring, security, machine health monitoring, predictive analysis, maintenance forecasting, and lifecycle management.

The command and control system 112 of the illustrated plant process management system 100 includes an asset manager 114, an authentication module 116, and an access control module 118. The asset manager 114 configures and manages assets, maintains and configures a plant hierarchy linking assets with locations in the plant, monitors and diagnoses connected process equipment, and communicates information about the condition of process equipment to users and to other components of the plant process management system. The authentication module 116 handles user account creation and configuration, user authentication, and authorizing actions against assets and other resources. The access control module handles span of responsibility verification and controls access to resources and assets in the plant hierarchy for user of the plant process management system 100. The operations involved in configuring the assets and plant hierarchy; configuring user accounts, permissions, and access controls; and implementing access control and asset permissions in relation to span of responsibility are detailed hereinafter.

Typically, each component of the command and control system 112 includes, at least, a processor and memory for storing and executing programs, an input/output interface, and communication interface and provide a user-interface 120, which encompasses applications, visual displays, audible prompts, and other communications enabling a user to receive information about and/or modify the configuration, operation, or status of the process plant via typing, touches, gestures, speech, or other human interface modalities. The components of the command and control system 112 may include appropriate human interface devices (e.g., monitors, projectors, keyboards, mice, touch screens, microphones, etc.) to provide the user interface locally. Alternatively, the user interfaces may be accessed remotely through human interface devices of a client device 122 (e.g., a desktop computer, a laptop computer, a tablet computer, or a smart phone) in communication with the command and control system 112 via a communications link 124 (e.g., a local area network, a wide area network, a cellular network, or the Internet).

The process equipment 104, machine interface devices 106, and the field devices are considered assets of the plant process management system 100. As used herein, the term "asset" broadly encompasses any machinery and process equipment that is monitored or controlled by the plant process management system and any machine interface devices, field devices, or other equipment used by the plant process management system to monitor or control the machinery and process equipment.

Figure 2:
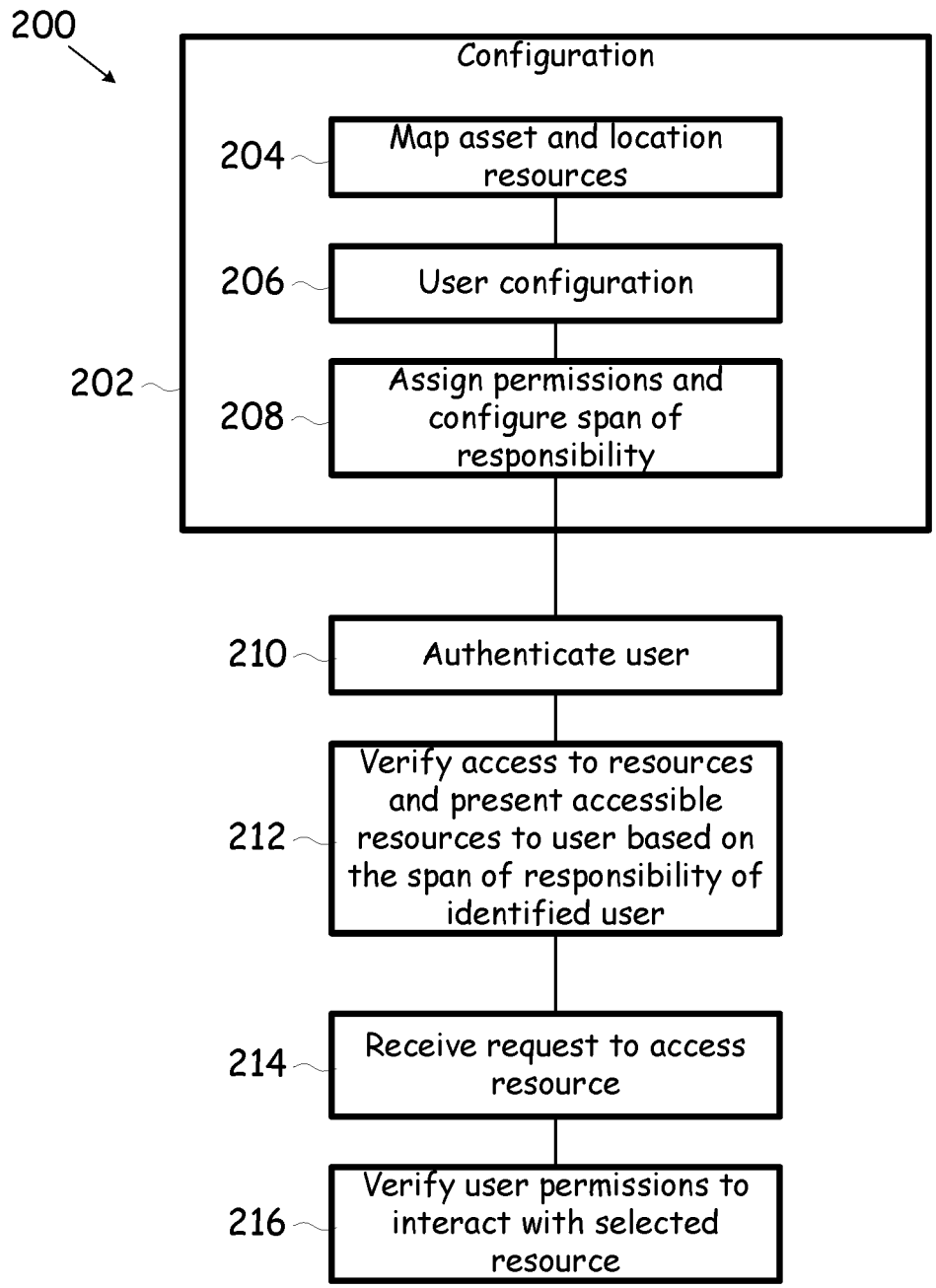
FIG. 2 is a flowchart illustrating aspects of a method for controlling access to system resources using span of responsibility assignments according to an embodiment of the present invention.

FIG. 2 is a flowchart illustrating aspects of a method for controlling access to system resources using span of responsibility assignments. The method 200 begins the configuration phase 202. In the configuration phase 202, assets, locations, add-ons, user accounts and other resources used by the plant process management system are created and configured.

During a resource mapping operation 204, resources and/or resource classes are defined and/or resource instances of assets, or asset sub-components, and locations are created, and optionally extended through add-ons, in the plant hierarchy maintained by the plant process management system. Each asset resource has a number of associated properties that store relevant details about the asset. The asset resource includes the following basic properties: an identifier used to reference the asset resource (ID), the type of asset (TYPE), and the location of the asset (LOCATION). When the asset resource identifier is complex or is otherwise not easily recognized or recalled by users, such as a global unique identifier (GUID), the asset resource properties typically also includes a friendly name property that stores a name or other user-friendly identifier which is displayed in the user interface.

Asset resources optionally include some or all of the following extended properties: a data storage route identifier (ROUTE), a host (HOST), a description of the asset (DESCRIPTION), manufacturer information (e.g., MANUFACTURER, MODEL NUMBER, etc.), unique asset information (e.g., SERIAL NUMBER), purchase information (e.g., VENDOR, PURCHASE DATE, PURCHASE PRICE, INVOICE NUMBER, etc.), life cycle information (e.g., IN-SERVICE DATE, END-OF-LIFE DATE, etc.), and asset specifications (e.g., VOLTAGE, HORSEPOWER, CYLINDERS, CAPACITY, etc.). The foregoing list of extended properties is intended to be illustrative and expansive, rather than restrictive, of the types and variety of asset information that may be tracked by the plant process management system and should not be read as limiting the scope of the invention in any way.

Additionally, in various embodiments, one or more user-defined (i.e., custom) properties may be added to an asset resource. Custom properties allow the plant process management system to store additional information about the asset that is not covered by one of the plant process management system's system-defined properties.

Aspects of the plant process management system include the definition of a group, or asset class, containing properties broadly applicable to certain types of assets. Broad asset classes may be extended by defining sub-classes containing properties applicable to subsets of the assets in the parent asset class. Each sub-class inherits the properties of its parent classes. Associating each asset resource with the most specific available asset class provides the asset resource with a ready-made and applicable set of properties.

The Location property specifies the physical location where the asset is located. In various embodiments, the LOCATION property contains an ordered listing of locations, arranged from general to specific. An example of such an ordered listing in a LOCATION property is "site.building_1.boiler_room" representing three location levels. Alternatively, the LOCATION property stores a location resource identifier that links the asset to a location resource that identifies the location and, optionally, other characteristics pertaining to the location. In yet another embodiment, the asset includes a set of LOCATION properties that each contain a single location. As with assets, some embodiments of the plant process management system employ location classes. Additional aspects of location resources are described below.

Location refers to the physical layout of a plant. In the plant process management system, a location resource represents a corresponding physical location in the plant. Location resources primarily operate as organizational units for logically grouping asset resources according the physical location of the corresponding physical asset. Typically, location resources are organized in a hierarchical arrangement, with the top-most location resource being the plant site. However, for enterprises operating multiple plant sites, the top-most location resource may represent a geographic area (e.g., a state, region, or country) or other type of location that encompasses one or more plants. Location resources for the sub-locations are arranged under the top-most location resource. By way of example, sub-locations of a plant may include various buildings and further sub-locations within the buildings, such as, but not limited to, basements, boiler rooms, production lines, etc. In various embodiments, location resource properties include a single LOCATION property that includes an ordered list that defines the position of the location resource within the plant hierarchy or a series of properties that each store a location.

Figure 4:
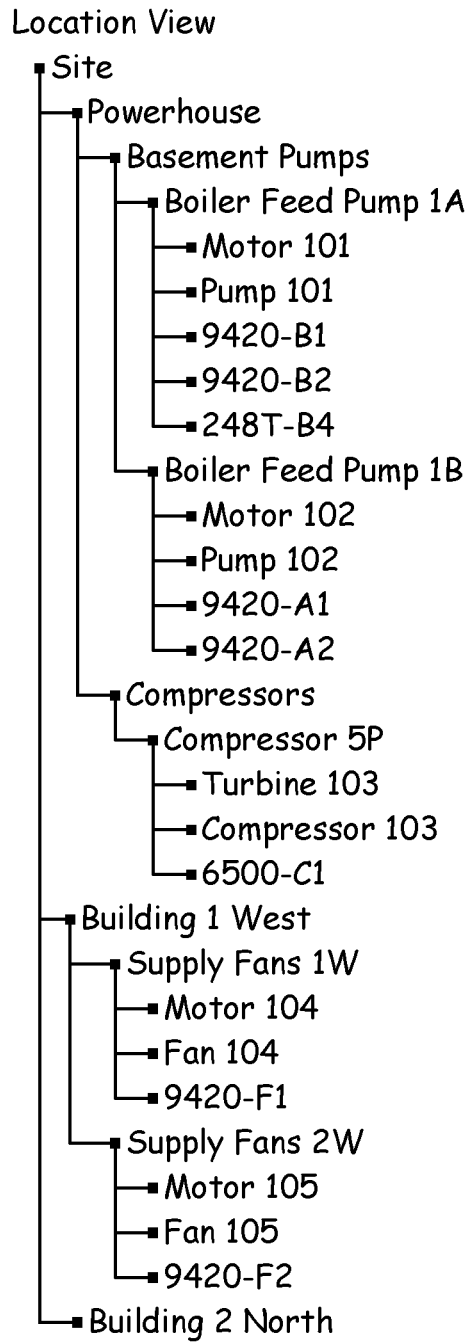
FIG. 4 illustrates a hierarchal location view for a representative plant site according to an embodiment of the present invention.

FIG. 4 illustrates a hierarchal location view for a representative plant site. In location views, the asset resources appear under the location resources to which they are assigned.

Add-ons are definitions of additional general properties applicable to locations and assets, and, optionally, other resources. Examples of add-ons include, without limitation, categories, failure effects, interfaces, and measurement types. Add-ons extend the resource to which they are attached without altering the type or class of that resource. For example, adding a temperature sensor add-on to an instance of a vibration monitoring device asset does not change the asset type/class. Instead, the properties included in the temperature sensor add-on are added to the vibration monitoring device asset and the asset definition is updated to reflect that it now carries the add-on.

In various embodiments of the plant process management system, the asset manager maintains and stores the plant hierarchy, via the user interface, and shares the plant hierarchy with other components of the plant process management system. In a preferred embodiment, a single plant hierarchy is maintained and displayable using different views that allow the resources to be organized and visualized based on different criteria of interest. In this regard, the plant process management system is able to display visualizations of the various resources in views sorted and/or grouped, at least, location and asset type. In alternate embodiments, separate plant hierarchies arranged by location, asset type, or other selected criteria are maintained or generated, as needed, or the arrangement of a single plant hierarchy is transformed in response to user selections.

Figure 3:
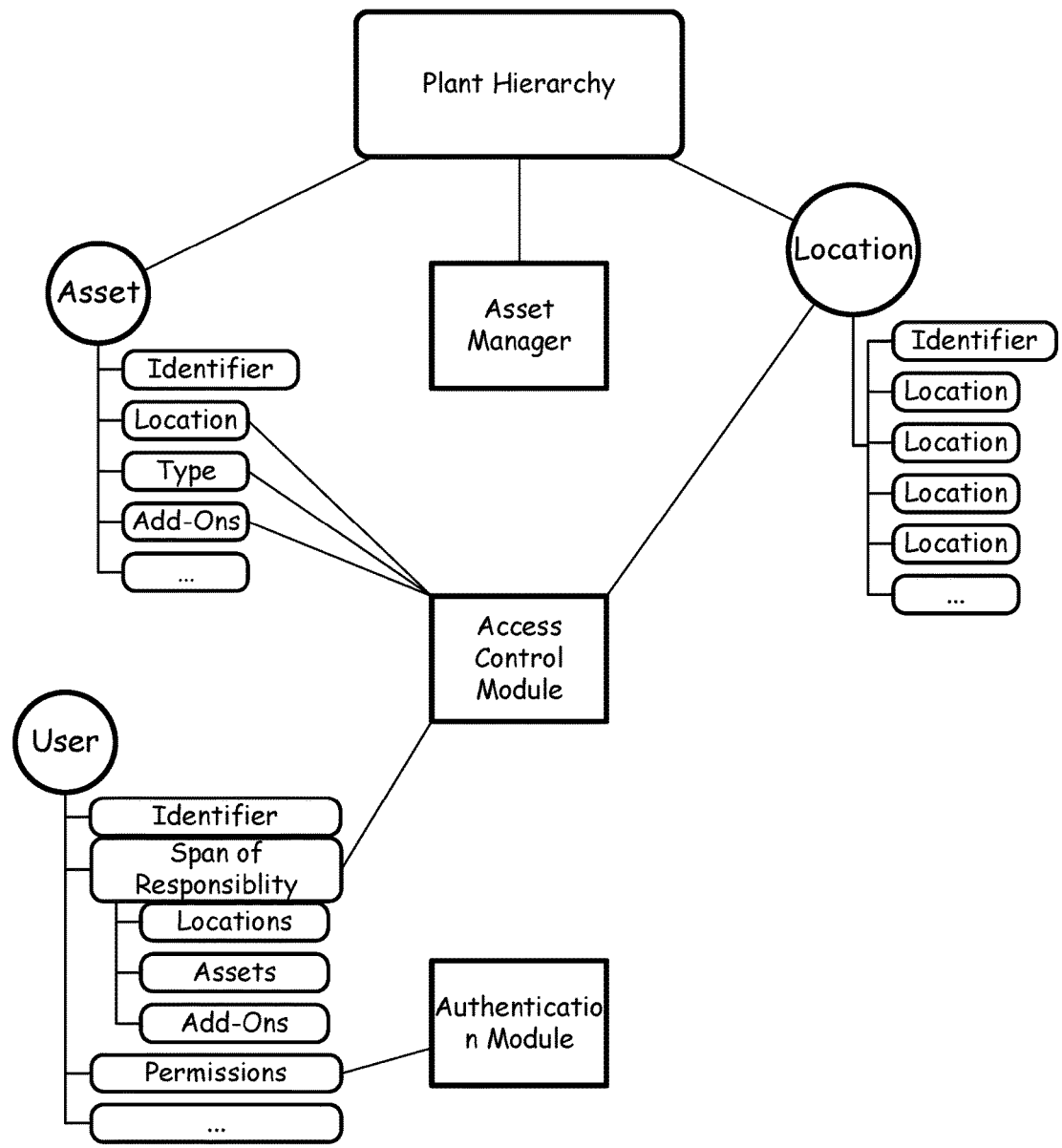
FIG. 3 illustrates aspects of the various resources according to an embodiment of the present invention.

Creation and configuration of user accounts is handled in a user configuration operation 206. As shown in FIG. 3, the user account stores the basic credentials, such as a user identifier (USER ID) and a password (PASSWORD), used to authenticate a user into the plant process management system. In various embodiments, the user account stores additional extended properties that specify additional characteristics of the user, such as, the user's name (e.g., FIRST NAME, LAST NAME, etc.), contact information (e.g., PHONE NUMBER, EXTENSION, ADDRESS, OFFICE NUMBER, etc.), the user's role(s) and associations (e.g., TITLE, GROUP, DIVISION, etc.).

Additionally, the user account stores, or is linked to, a set of permissions that define the actions that the user is authorized to perform against assets and other resources in the plant process management system. For example, permissions determine whether a user is allowed to read or edit the configuration of an asset, add or remove an asset, and create or view reports from live or stored data, and other activities accomplished through the plant process management system.

In addition to permissions, the user account stores, or is linked to, the user's span of responsibility. The span of responsibility defines what assets and other resources in the plant process management system are accessible to the user. In various embodiments, the span of responsibility includes one or more of, but is not limited to, an asset component, a location component, and an add-on component. The span of responsibility components specify values of properties in the corresponding resources are used to determine the user's ability to access assets and resources in the plant process management system.

Span of responsibility is associated with the user account in a rights and responsibilities assignment operation 208. The span of responsibility location component includes at least one property for designating locations that the user is authorized to access (e.g., Accessible). In some embodiments, the span of responsibility location component may include an additional location property that stores sub-locations expressly excluded from the location assigned to the location property (e.g., Exclusions). In the preferred embodiment, locations assigned to the span of responsibility location component are restrictive in nature (i.e., closed sets). In other words, a user only has access to assets within the scope of locations assigned to the span of responsibility location component, regardless of any other span of responsibility component assignments.

Where hierarchal arrangements are used, the scope of the span of responsibility location component includes sub-locations of the assigned location(s), unless an exclusion of a specific sub-location is added. For example, referring again to FIG. 4, adding the span of responsibility location component limiting access to the "Powerhouse" location and adding the "Compressors" location as an exclusion would effectively allow the user to only access the assets in "Basement Pumps" location.

The span of responsibility asset and add-on components also include at least a property for designating specific assets, asset types/classes, and add-ons that the user is authorized to access (e.g., Accessible), and optionally have a property to exclude specific assets, asset types/classes, and add-ons. In contrast to the span of responsibility location component, the span of responsibility asset and add-on components are permissive in nature (i.e., open sets).

The restrictive relationship implies a logical AND relationship between the assigned values of the span of responsibility location component and other span of responsibility components, while the permissive relationship implies a logical OR operation between the assigned values of the span of responsibility asset and add-on components. Any exclusions introduce logical ANDNOT operations into the calculation, as appropriate. Thus, the span of responsibility location component is the dominant criteria in any access verification operation.

For example, referring again to FIG. 4, a user that has a span of responsibility asset component allowing access to motor class assets and a span of responsibility location component limiting access to the "Basement Pumps" location would be able to access motors in the "Basement Pumps" location (i.e., "Motor 101" and "Motor 102"), but would not have not have access to any other motor (e.g., "Motor 104" and "Motor 105" in "Building 1 West").

In various embodiments, the span of responsibility components store a collection of resource identifiers (e.g., references to the resources in the plant hierarchy) and configuration of access rights is accomplished by setting a value (e.g., flag) associated with each resource identifier in the collection. The value indicates whether the user is granted access to the corresponding resource. In other embodiments, span of responsibility components store unique identifiers corresponding to resources that the user may or may not access. In some embodiments, access is expressly granted by storing the unique identifiers for resources or classes of resources that the user is allowed to access, and the user is not allowed to access any resource if the unique identifier not assigned to the appropriate span of responsibility component. In other embodiments, access is implicitly granted by storing identifiers for resources or resource classes that the user is not allowed to access, and the user is allowed to access any resource unless its identifier is stored in the span of responsibility component.

It should be noted that while the Accessible and Exclusions properties are described as separate properties, other suitable implementations are available and fall within the scope and spirit of the present invention, such as the collection resources and flags described above. Alternatively, a single property allowing designation of a resource identifier and a status marker (e.g., "+[Building 1]; −[Building 1]!Basement").

Similarly, although described as separate properties, various relaxed implementations treat assets and add-ons as interchangeable, at least with respect to add-ons that can extend an asset class. For example, some implementations combine the span of responsibility asset and add-on components into a single component or check assets and/or add-ons against both span of responsibility components. Alternatively, in some embodiments, the span of responsibility asset component accepts add-ons as values and the span of responsibility add-on component accepts assets as values. Strict implementations require both the asset class and the corresponding add-on to be added to cover all possibilities.

For example, in the case of a user with responsibility for all temperature measuring devices at the plant, if the temperature sensor add-on is included to the user's span of responsibility, the user would be able to access an asset resource for a vibration monitoring device that includes a temperature sensor, provided the vibration monitoring device asset resource was extended with the temperature sensor add-on. However, even if the user is able to gain access, the user must have appropriate permissions in order to perform actions against the vibration monitoring device.

The embodiments of the plant process management system based on asset classes and add-ons show specific and concrete examples utility of the span-of-responsibility based access control. While asset classes and add-ons simplify the definition and creation of assets and facilitate implementation, the use of asset classes and add-ons is not required to realize the benefits of span-of-responsibility based access control. Accordingly, the scope of the claimed invention should not be limited to the embodiments described herein.

The span of responsibility is independent and distinct from permissions. As mentioned above, the purpose of permissions is to define what actions a user is authorized to take against resources in the plant process management system. A typical scenario illustrating the function of permissions involves authorizing different users to work with a field controller. A system engineer would typically be granted full rights to the field controller, including the rights to view and edit the configuration of the device. A maintenance technician would be granted limited rights, allowing the technician to view, but not edit, the device configuration. A plant operator might not have any rights to the configuration, but be permitted to invoke any operational functions of the field controller. In a conventional plant process management system, all of these users can locate and access the field controller, regardless of whether or not the user has permission to actual use the device.

Span of responsibility does not determine what a user can or cannot do with an asset resource or other object in the plant process management system. Instead, span of responsibility determines whether the user can interact with, or even see, the asset resource or other object. In the first instance, asset resources outside of the user's span of responsibility are displayed in the user interface, but are, at least, unresponsive to interaction attempts, and, preferably, shown as in active. In the latter instance, asset resources outside of the user's span of responsibility are hidden from the user and do not appear in the user interface.

Span of responsibility provides several real and tangible benefits. First, span of responsibility improves user efficiency by reducing the amount of noise, in the form of assets that are of no interest to the user, that the user must deal with when using the plant process management system. The user experience is improved because the user is immediately shown the assets that are relevant to the user. In situations where the plant process management system manages thousands or tens of thousands of assets and the user is responsible for only small fraction of those assets, it is unnecessarily time consuming for the user to scroll through all of the irrelevant options.

Another benefit is a reduction in computing resources required and expended to operate the plant process management system. As previously mentioned, users can connect to the plant process management system through a wide variety of client devices. Not all client devices are created equal. Some types of client devices, notably, smart phones, have less memory, limited processors, and smaller display screens than other client device types. Even a low end laptop generally has a faster processor, more memory, and a larger screen than a high end smart phone. By excluding assets for which the user is not responsible from the list of assets presented, memory and processing requirements are reduced. Further, the user is required to do less navigation through a list populated only with assets that are needed by the user, which improves the user experience on devices with small screens and also saves battery usage by reducing screen on time. Smaller lists also reduce bandwidth requirements and data usage when transferring the information to the client device. This offers benefits such as shorter download times, making the client device and the plant process management system more responsive and reducing radio on time, which again conserves battery. Reducing the list size also makes usage practicable over slow and/or small bandwidth connections. On metered connections, reduced data usage has economic benefits.

After the initial configuration of the plant process management system and the user account, subsequent usage of the plant process management system is subject to span-of-responsibility based access control. The method 200 includes a user authentication operation 210 wherein the authentication module identifies the user interacting with the plant process management system. The user authentication operation compares the credentials provided by the user to the credentials associated with the user accounts created in the plant process management system to determine the identity of the user. At a minimum, the user account credentials include a unique user identifier (e.g., a user name). In various embodiments, the user account credentials also include one or more identity proofs. Examples of identity proofs include personal identification numbers, passwords, and challenge question/answer pairs. If the credentials match, the identity of the user is established allowing the plant process management system to determine the assets accessible to the user and the user's rights to interact with the user accessible assets.

In a responsibility matching operation 212, the access control module evaluates the span of responsibility for the identified user against the plant hierarchy. In various embodiments, the access control module generates a subset of the plant hierarchy containing only those resources that fall within the user's span of responsibility and outputs the plant hierarchy subset to the user through the user interface via one or more human interface devices of the command and control component or client device supporting the appropriate input/output modalities. For example, a visual representation of the plant hierarchy subset is shown on a display screen or touch screen and/or an audible representation of the plant hierarchy is read to the user by a text-to-speech module via a speaker. In various embodiments, the plant hierarchy subset of the entire plant hierarchy is generated at one time. In other embodiments, the plant hierarchy subset is generated iteratively for the hierarchical level, hierarchy branch, resource, or other grouping selected by user as the user navigates through the hierarchy.

In an asset interaction operation 214, the plant process management system receives an input (e.g., a mouse click, a touch gesture, or speech) from the user through the user interface through the corresponding human interface device identifying a resource selected by the user.

In a permission verification operation 216, the plant process management system determines what actions against the selected asset resource are permitted for the identified user. In various embodiments, the plant process management system compares the rights granted to the user for the asset resource to determine what actions against the asset resource are offer to the user and displays only the permitted actions as options to the user. Alternatively, when the user attempts an action against a selected asset, the plant process management system determines whether the action is permitted for the user and either completes the action or notifies the user that the action is not allowed, based on the results of the available action determination.

While described in the context of a plant process management system, the span of responsibility access control system disclosed herein has applicability to other systems where users only require access to a subset of available resources within the system that can be grouped according to resource specific property values.

Figure 5:
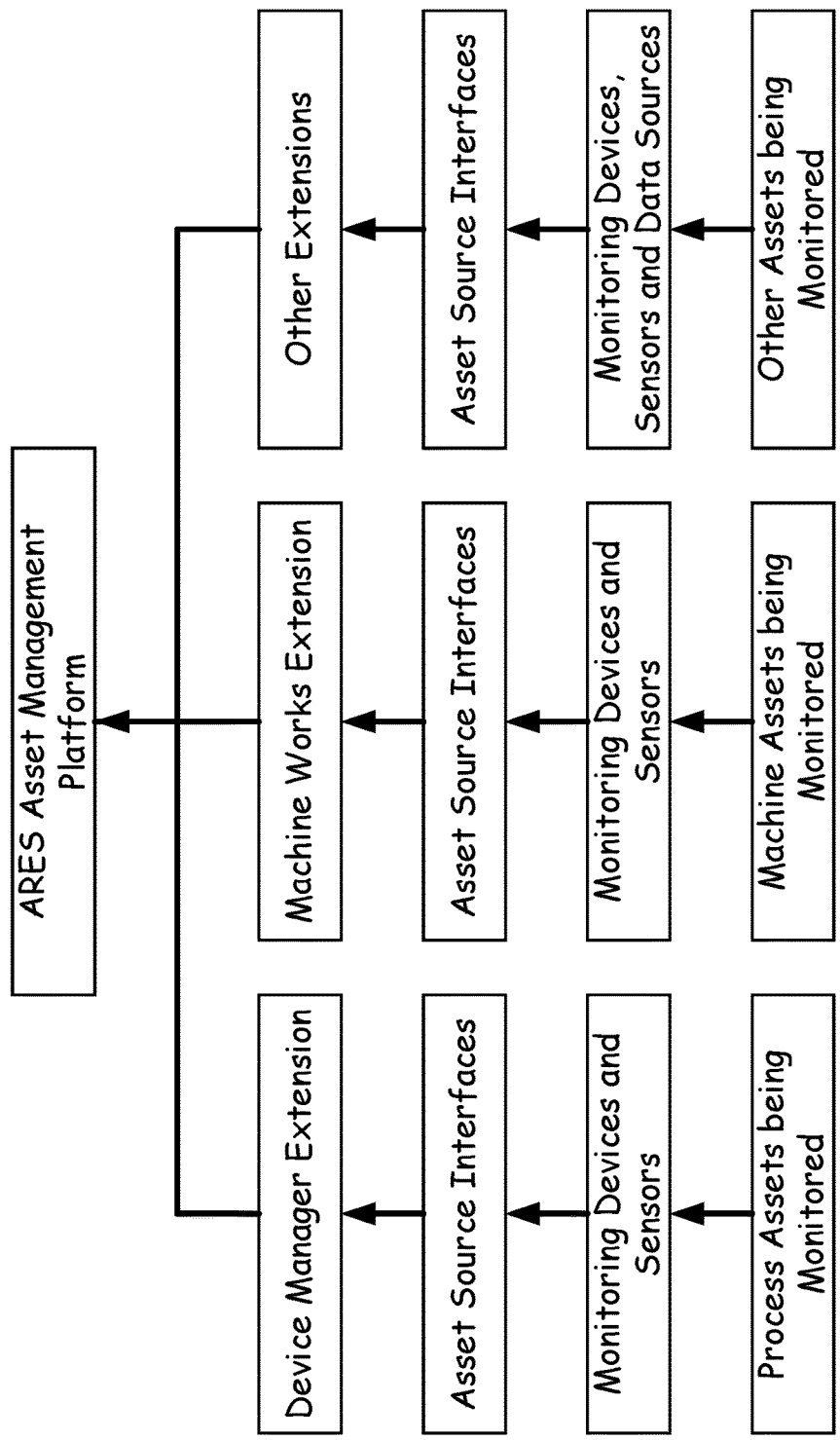
FIG. 5 is an alternate simplified diagram of a representative hierarchical arrangement of assets monitored using the management system according to an embodiment of the present invention.

With reference now to FIG. 5 there is given a depiction of an embodiment of the hierarchical system for monitoring and retrieving data in regard to process assets (in the left-hand column), machine assets (in the middle column), and other assets (in the right-hand column). As given on the bottom-most row, there are representations of the actual assets being monitored. In the next row up are representations of the devices and sensors that monitor the assets represented on the bottom row, and the data that flows from assets to the monitoring devices and sensor. The data from the monitoring devices and sensors flows upward to the asset source interfaces tier, and from there to the associated extension, whether it be the device manager extension, the machine works extension, or other extension. From there the data is delivered in a desired protocol to the system as described elsewhere herein.

Figure 6:
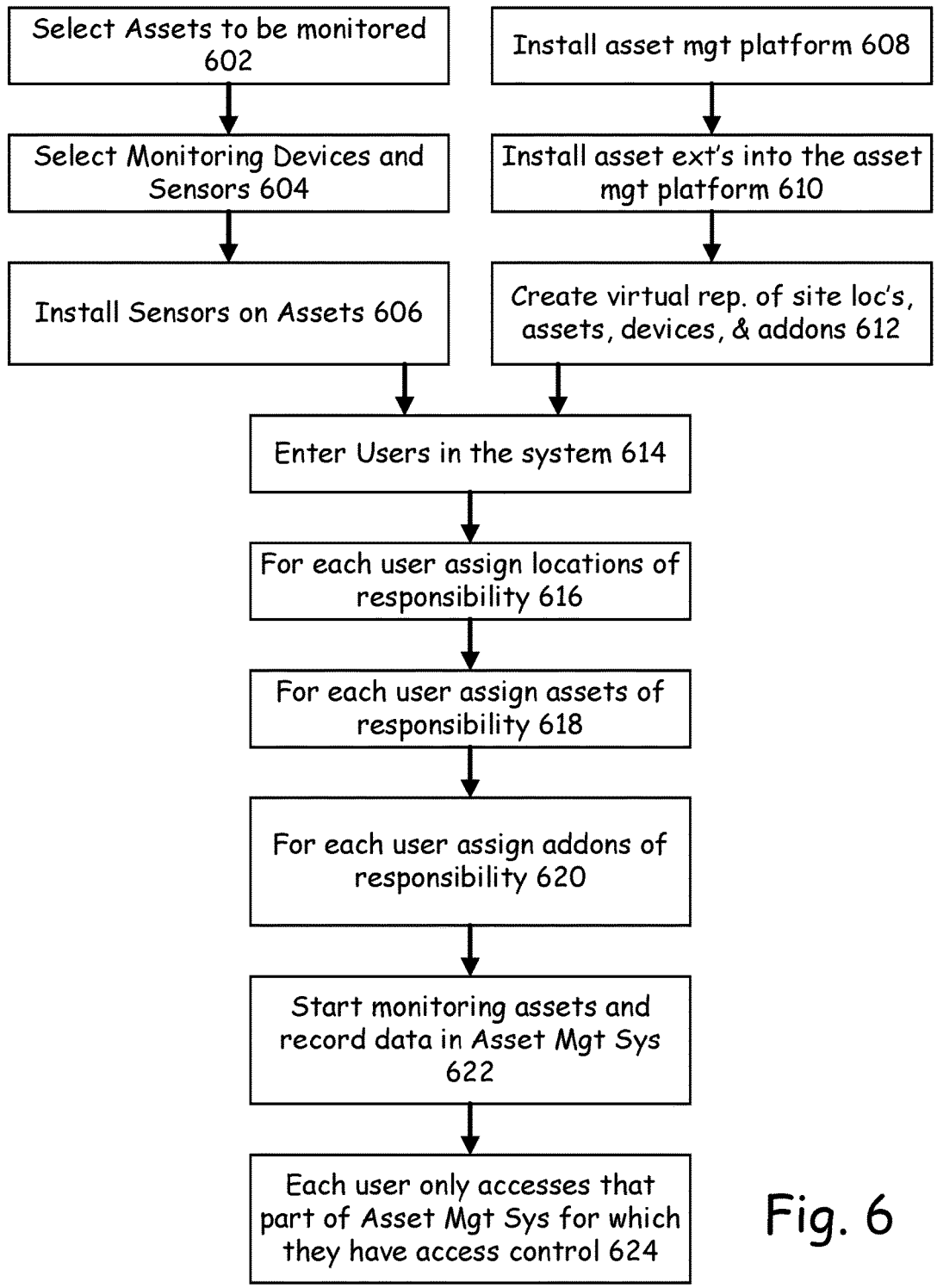
FIG. 6 is a flowchart illustrating aspects of a method of asset health monitoring management performed by the asset management system according to another embodiment of the present invention.

FIG. 6 depicts an overall method by which the system is set up and operates. The assets to be monitored are selected, as given in block 602, and appropriate monitoring devices and sensors are selected as given in block 604. The sensors are then installed on the assets, as given in block 606. Either before, during, or after that process the asset management platform software is installed on appropriate computing systems, as described above, and as given in block 608. The appropriate asset extensions are then installed into the asset management platform, as given in block 610, which extensions are associated with the assets that were selected for monitoring, as given in block 602. A virtual representation of the site locations, assets, and devices, as described elsewhere herein, is then built within the asset management platform, as given in block 612, as a virtual model of the locations, assets, and devices.

Once these preliminary setup operations have been completed, the various system users are entered into the system, as given in block 614. For each user entered, an assignment of locations for which that user is responsible is made, as given in block 616. Additionally, for each user entered, an assignment of assets for which that user is responsible is made, as given in block 618. Finally, for each user entered, an assignment of add-ons for which that user is responsible is made, as given in block 620. Thus, these three blocks 616, 618, and 620 define the scope of responsibility for each user entered into the system in block 614.

Once the scope of responsibility has been defined for a user, the assets are monitored and the accumulated data is recorded in the asset management system, as given in block 622. Each user only accesses those elements for which they have access control, as defined by their assigned scope of responsibility, as given in block 624. FIGS. 7-10 depict how one embodiment of this looks in a hierarchical paradigm.

Figure 7:
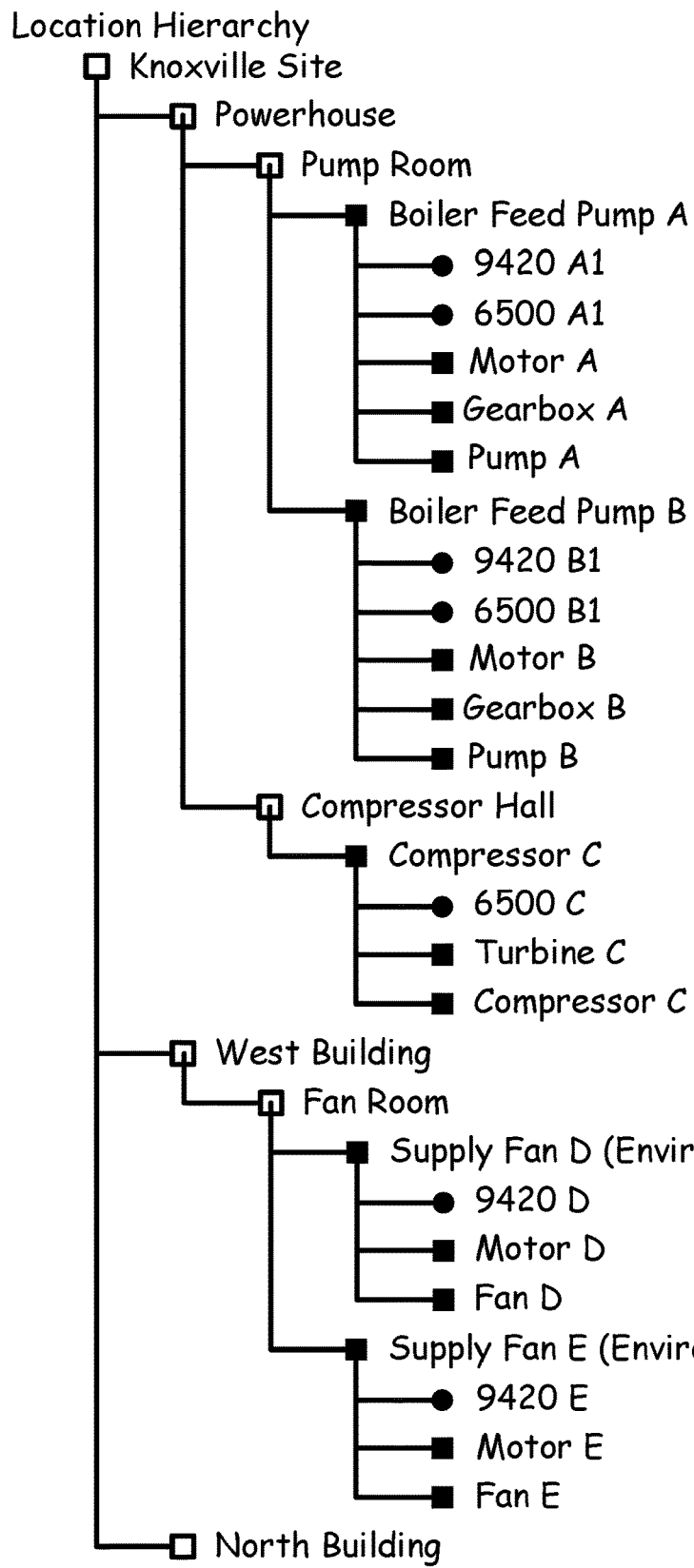
FIG. 7 depicts a location-centric hierarchical view of locations, assets, devices, and sensors according to an embodiment of the present invention.

FIG. 7 depicts an embodiment of the hierarchical nature of the system, as depicted in a location-centric manner. In the embodiment of FIG. 7, the top-most level is a given asset site, such as might be designated by a campus, city, state, country, or world-wide. Within the site are various installations, which in the example depicted in FIG. 7 are recited as buildings. Within each building there may be listed different areas, such as different process areas, different manufacturing lines, different departments, different rooms, and so forth. Within each area are located different assets, such as machines or other equipment, such as the boilers, compressors, and fans, as depicted. Note that one of the supply fan assets (machine) has the "environmental" add-on assigned to it, which is describe in more detail elsewhere herein.

Also as depicted, a given machine, or machine train, can have multiple sub components that are each individually monitored, such as the motor, gearbox, and pump as depicted in FIG. 7. Monitoring devices, each having one or more sensors, are also listed in the hierarchical tree. In this manner, what could otherwise be an overwhelming number of sensors—which produce an overwhelming amount of data—is placed into a hierarchical structure and readily identified. It is appreciated that more or fewer hierarchical layers than that as depicted are contemplated.

The location hierarchy of FIG. 7 is a virtual representation of the site showing locations and assets in the asset management system. This representation enables a user to navigate the system and only have access to that portion of the site for which they have access rights (span of responsibility) as determined by the user access control system.

Figure 8:
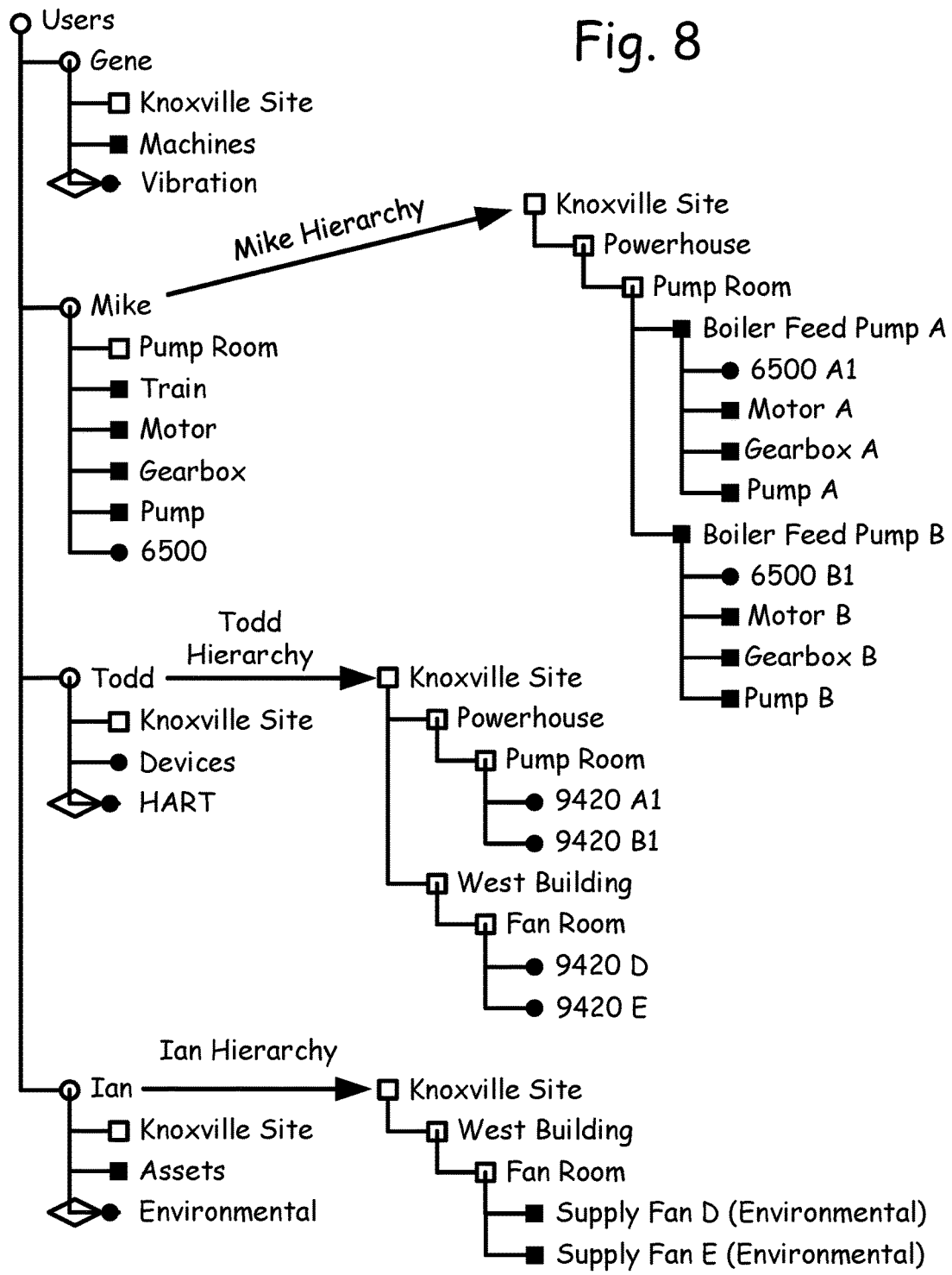
FIG. 8 depicts a user-centric hierarchical view of responsibility assignments according to an embodiment of the present invention.

With reference now to FIG. 8, there is depicted an embodiment of a hierarchical system view that is user-centric, which represents the user access control system, and which graphically depicts the span of responsibility for various system users. In the embodiment depicted, we see the span of responsibility for Gene, Mike, Todd, and Ian.

For each user's span of responsibility, the following is defined: (1) the locations in the site for which they have access rights, (2) the classes (machines, devices, etc.) they can access (i.e. add, delete, configure, analyze etc.), and (3) which add-ons are applicable to their span of responsibility. If no add-ons are assigned in the system, then by default in one embodiment they are not ignored in the span of responsibility.

In the example depicted in FIG. 8, Gene has access to the entire site and all machine assets and all devices that have the vibration add-on. By contrast, Mike's span of responsibility limits him to only the pump room, and within that location, only to machine trains, motors, gearboxes and pumps. He can also only access 6500 monitoring devices, and has no access to the 9420 monitoring devices, even though they are in the pump room location.

In a similar manner, Todd has access to the entire site, but only has span of responsibility for devices that are further restricted to the HART add-on (i.e. 9420's). He therefore does not have access to any machine assets and 6500 devices. The 6500 devices do not have the HART add-on, and therefore he does not have access rights to them. Ian has access to the entire site and all assets (machines, devices). However, he only has access to those assets that have the environmental add-on.

Figure 9:
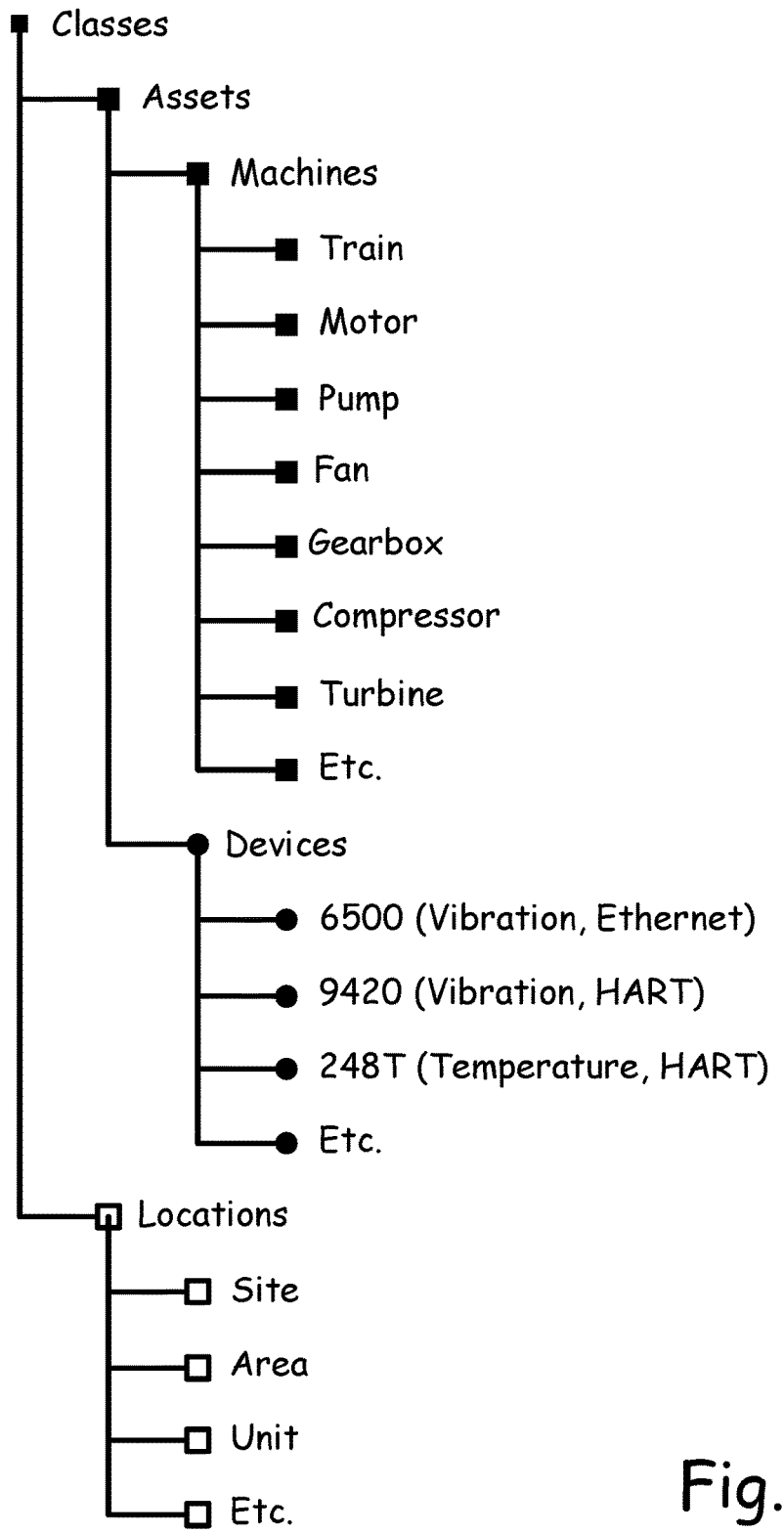
FIG. 9 depicts a class-centric hierarchical view according to an embodiment of the present invention.
Figure 10:
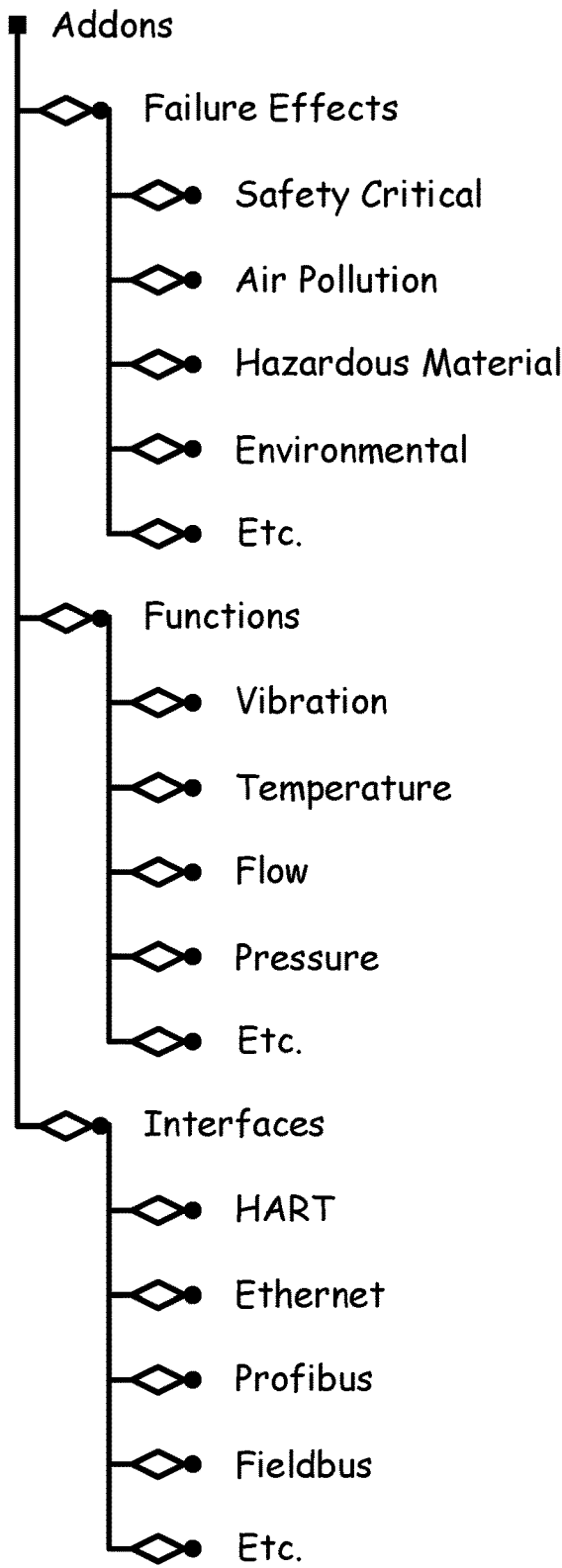
FIG. 10 depicts an add-on hierarchical view according to an embodiment of the present invention.

With reference now to FIG. 9, there is depicted an embodiment of a hierarchical view of the system that is class-centric. The class hierarchy defines the various types of objects (classes) that the asset management system understands. The class hierarchy of one embodiment uses simple properties inheritance, meaning that a sub-class or child class inherits certain properties from its parent class, but is then further defined. For example, a machine is an asset and a motor is a machine and an asset etc.

However, simple inheritance on its own does not necessarily fully describe a class. To overcome this limitation, the concept of an add-on enables the asset to be further defined, as depicted in the add-on hierarchy depiction of FIG. 10. Class definitions may have pre-defined add-ons as shown for the 248T device in FIG. 9. As depicted in the embodiment of FIG. 9, 248T devices have add-ons that define them as a temperature device and a HART device. Thus, add-ons enable further refinement to a user's span of responsibility. Add-ons may also be assign to individual instances of a class in the location hierarchy. For example, certain instances of machine assets in the location hierarchy may be assigned the safety-critical add-on, enabling a user access to those assets with the appropriate access control settings.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A system for controlling views of resources of a plant control environment, the system comprising:
    user accounts for users of the plant control environment, each user account having associated credentials, permissions, and user-selected spans of responsibility corresponding to a user;
    a plant hierarchy comprising an organized arrangement of location resources and asset resources, each asset resource linked to at least one location resource;
    a user authentication module determining an identity of a user based on the credentials supplied by the user and controlling the identified user's ability to perform actions against the resources of the plant control environment based on the identified user's permissions; and an access control module controlling the identified user's views of the resources of the plant control environment based on the identified user's selected span of responsibility, wherein each span of responsibility comprises at least one of a location component, an asset component, and an add-on component.

2. The system of claim 1 wherein each asset resource includes an asset type property specifying a group of assets to which the asset resource belongs.

3. The system of claim 2 wherein the span of responsibility comprises an asset type property, the asset resource falling within the span of responsibility of the identified user when the asset type property of the asset matches the asset type property of the span of responsibility.

4. The system of claim 2 wherein the span of responsibility comprises an asset type property and a location property, the asset resource falling within the span of responsibility of the identified user when the asset type property of the asset matches the asset type property of the span of responsibility and the location property of the asset matches the location property of the span of responsibility.

5. The system of claim 2 wherein the span of responsibility comprises an asset type property, a location property, and an add-on type property, the asset resource falling within the span of responsibility of the identified user when the location property of the asset matches the location property of the span of responsibility and one of the asset type property and the add-on type property of the asset matches the corresponding property of the span of responsibility.

6. The system of claim 1 wherein the plant control environment includes at least one location and at least one asset associated with each location, the span of responsibility having an asset component defining at least one of the assets and asset types to which the identified user has access and a location component defining the locations within the plant control environment to which the identified user has access.

7. A method of limiting views of resources of a plant control environment in a process plant management system, the method comprising the acts of:
identifying a user of the process plant management system;
retrieving permissions associated with the identified user;
determining the identified user's ability to perform actions against resources of the plant control environment based on the identified user's permissions;
retrieving a user-selected span of responsibility associated with the identified user;
determining resources managed by the process plant management system that fall within the span of responsibility of the identified user based on properties of the resources; and
presenting the resources within the span of responsibility of the identified user via an output device, wherein each span of responsibility comprises at least one of a location component, an asset component, and an add-on component.

8. The method of claim 7 further comprising the acts of:
receiving a request from the identified user to access a selected resource managed by the process plant management system;
determining that the selected resource is accessible to the user based on the identified user's span of responsibility; and
when the selected resource is accessible to the identified user, determining actions performable by the identified user against the selected resource based on the permissions granted to the identified user.

9. The method of claim 7 wherein the act of presenting the resources within the span of responsibility of the identified user via an output device further comprises the act of presenting only the resources within the span of responsibility of the identified user via the output device.

10. The method of claim 9 further comprising the acts of:
receiving a request from the identified user to access a selected resource managed by the process plant management system and accessible to the identified user; and
determining actions performable by the identified user against the selected resource based on the permissions granted to the identified user.

11. The method of claim 7 wherein the act of presenting the resources within the span of responsibility of the identified user to via an output device further comprises the act of presenting the resources of a plant hierarchy to the identified user via the output device with only the resources within the span of responsibility of the identified user being accessible to the identified user.

12. The method of claim 11 further comprising the acts of:
receiving a request from the identified user to access a selected resource managed by the process plant management system and accessible to the identified user; and
determining actions performable by the identified user against the selected resource based on the permissions granted to the identified user.

13. The method of claim 7 further comprising the act of receiving a request from the identified user to access resources managed by the process plant management system, the acts of determining the resources managed by the process plant management system that fall within the span of responsibility of the identified user based on properties of the resources and presenting the resources within the span of responsibility of the identified user to via an output device occurring in response to receiving the request.

* * * * *